(12) United States Patent
Pepe et al.

(10) Patent No.: US 10,352,489 B2
(45) Date of Patent: Jul. 16, 2019

(54) QUICK CONNECTOR

(71) Applicant: TI Group Automotive Systems, LLC, Auburn Hills, MI (US)

(72) Inventors: Rick Pepe, Macomb, MI (US); David Gabbey, Pinckney, MI (US)

(73) Assignee: TI GROUP AUTOMOTIVE SYSTEMS, LLC, Auburn Hills, MI (US)

( * ) Notice: Subject to any disclaimer, the term of this patent is extended or adjusted under 35 U.S.C. 154(b) by 376 days.

(21) Appl. No.: 15/185,489

(22) Filed: Jun. 17, 2016

(65) Prior Publication Data

US 2017/0363237 A1    Dec. 21, 2017

(51) Int. Cl.
*F16L 37/14*    (2006.01)
*F16L 37/088*    (2006.01)

(52) U.S. Cl.
CPC ........... *F16L 37/144* (2013.01); *F16L 37/088* (2013.01); *F16L 2201/10* (2013.01)

(58) Field of Classification Search
CPC .... F16L 37/088; F16L 37/144; F16L 2201/10
USPC .................................. 285/93, 319
See application file for complete search history.

(56) References Cited

U.S. PATENT DOCUMENTS

| | | |
|---|---|---|
| 5,775,738 A | 7/1998 | Bartholomew |
| 5,927,761 A | 7/1999 | Bartholomew |
| 6,086,113 A | 7/2000 | Bartholomew |
| 6,564,775 B1 | 5/2003 | Kikuta et al. |
| 7,108,297 B2 | 9/2006 | Takayanagi et al. |
| 7,201,403 B2 | 4/2007 | Takayanagi et al. |
| 7,401,820 B2 | 7/2008 | Niki |
| 7,438,328 B2 | 10/2008 | Mori et al. |
| 7,484,774 B2 | 2/2009 | Kerin et al. |
| 7,695,512 B2 | 4/2010 | Lashinski et al. |
| 8,740,256 B2 | 6/2014 | Fansler et al. |
| 8,973,952 B2 | 3/2015 | Nishino et al. |
| 2005/0060030 A1 | 3/2005 | Lashinski et al. |
| 2005/0153593 A1 | 7/2005 | Takayanagi et al. |

(Continued)

OTHER PUBLICATIONS

Website page of "The New Quick Connector Generation P2L" from Rayconnect, Inc., Oct. 1, 2009, 1 page (http://www.araymond-automotive.com/news/category-2-inside-araymond/937-the-new-quick-connector-generation-p2l%C2%AE-is-in-production-a-success-story-for-rayconnect).

(Continued)

*Primary Examiner* — Greg Binda
*Assistant Examiner* — Zachary T Dragicevich
(74) *Attorney, Agent, or Firm* — Brinks Gilson & Lione

(57) ABSTRACT

A quick connect coupling includes a hollow female connector body, a male end form configured to be received in the female connector body, a retainer, and a verifier coupled. An entry end of the female connector body defines a pair of windows on opposite sides of the entry end. The retainer extends along the windows and into a bore of the female connector body. The verifier includes legs and feet that extend into the windows and into the bore. The windows define a ramped edge, and the retainer is forced against the ramped edge by an annular upset of the male end form. The retainer spreads outward and springs back after the upset clears the retainer. The feet of the verifier include a ramped surface and spread outward in response to a force applied by the upset. The verifier can be pushed down after the legs are spread apart.

23 Claims, 12 Drawing Sheets

(56) References Cited

U.S. PATENT DOCUMENTS

| | | |
|---|---|---|
| 2006/0099839 A1 | 5/2006 | Ishida et al. |
| 2006/0145475 A1 | 7/2006 | Walker et al. |
| 2006/0214420 A1 | 9/2006 | Mori et al. |
| 2008/0007052 A1 | 1/2008 | Niki |
| 2010/0032937 A1* | 2/2010 | Kerin .................. F16L 37/144 285/93 X |
| 2012/0104746 A1 | 5/2012 | Fansler et al. |
| 2015/0101173 A1 | 4/2015 | Hartmann |
| 2016/0201835 A1* | 7/2016 | Jones .................. F16L 37/144 |
| 2017/0067588 A1* | 3/2017 | Chaupin ............... F16L 37/088 |

OTHER PUBLICATIONS

Website page of "P2L Quick Connector" from Rayconnect, Inc., 2 pages (http://connecting.araymond-automotive.com/en/glossary/p2l-quick-connector/).

Website page of "P2L QC Fuel System" from Rayconnect, Inc., 2 pages (http://connecting.araymond-automotive.com/en/e81-p28534.htm).

Website page of "Powertrain" from Rayconnect, Inc., 2 pages (http://www.araymond-automotive.com/products#!/fluid-connection-engine/standard-qc-1).

Screen shot of website page for video of "P2L Quick Connector" from Rayconnect, Inc., 1 page (https://vimeo.com/125579852).

* cited by examiner

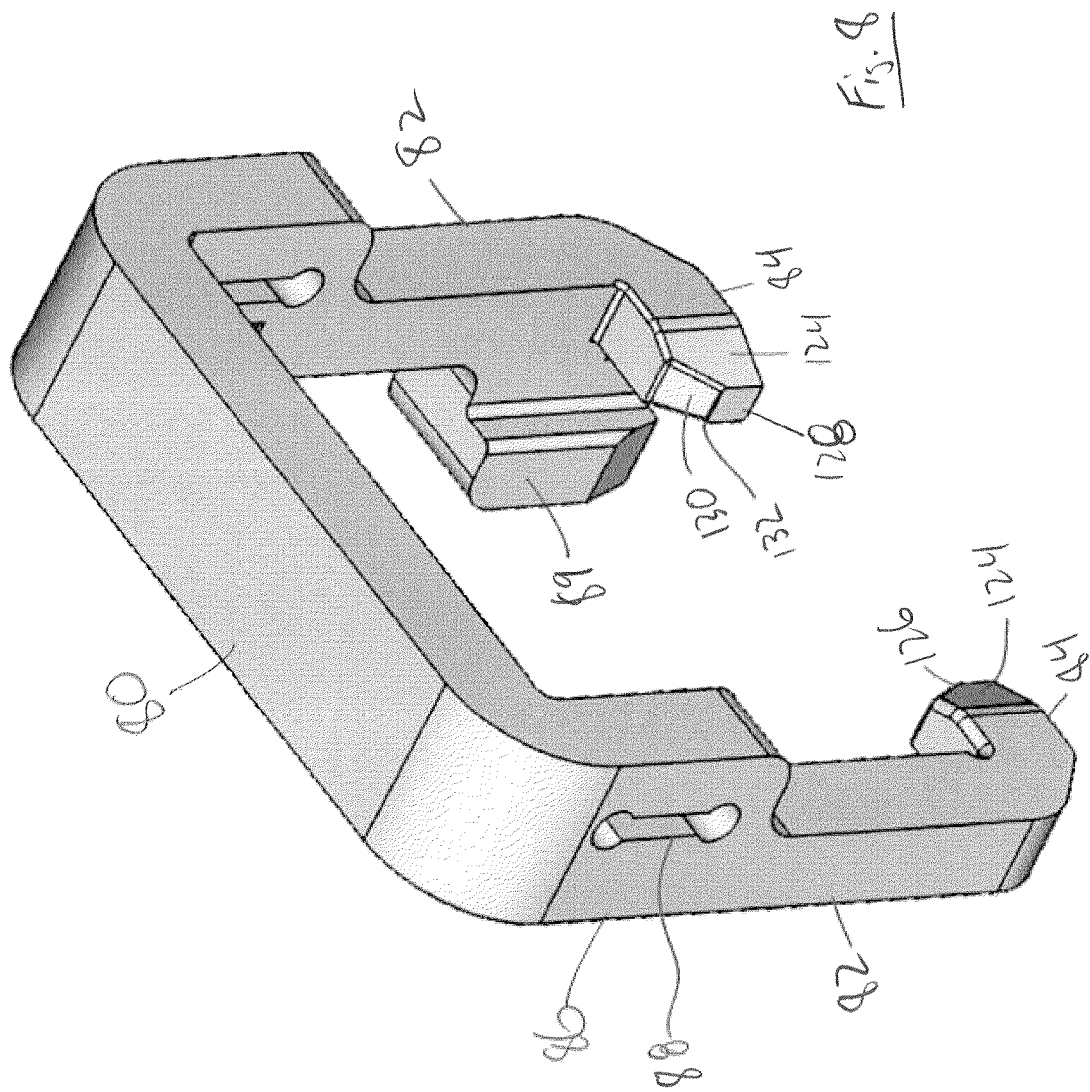

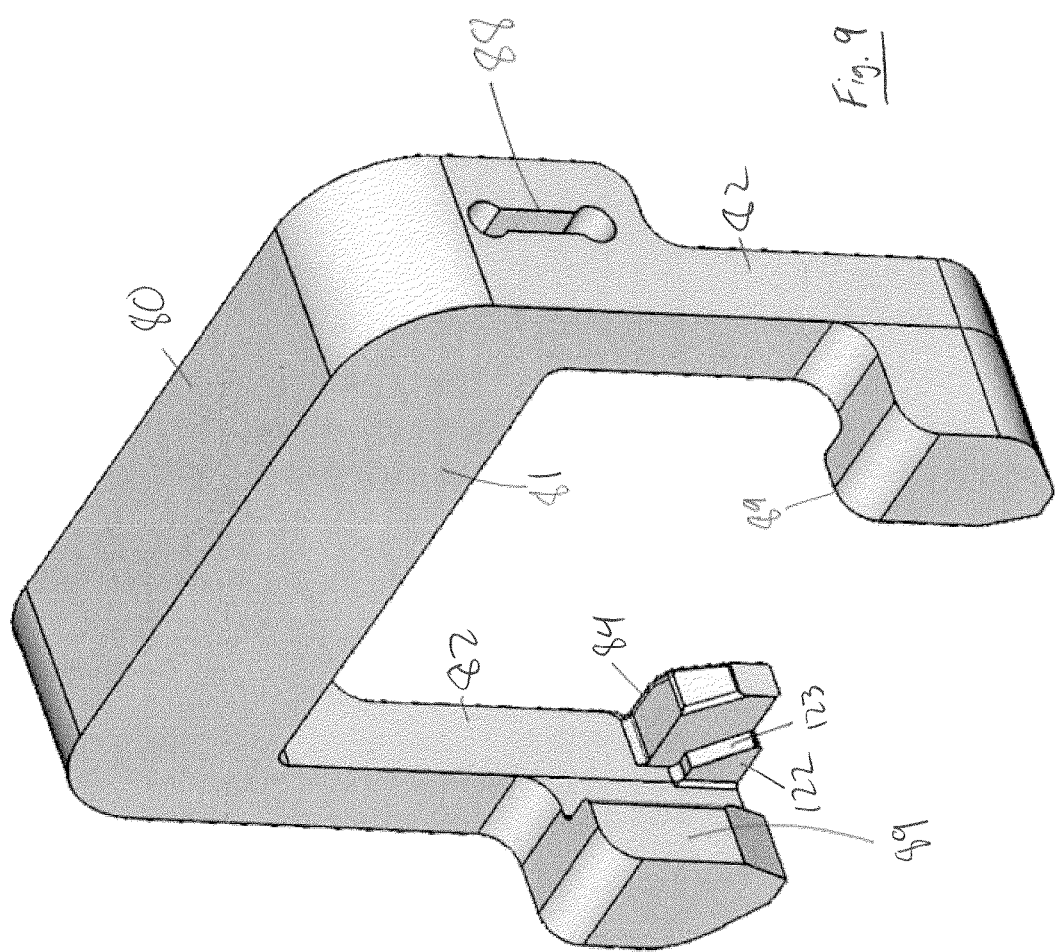

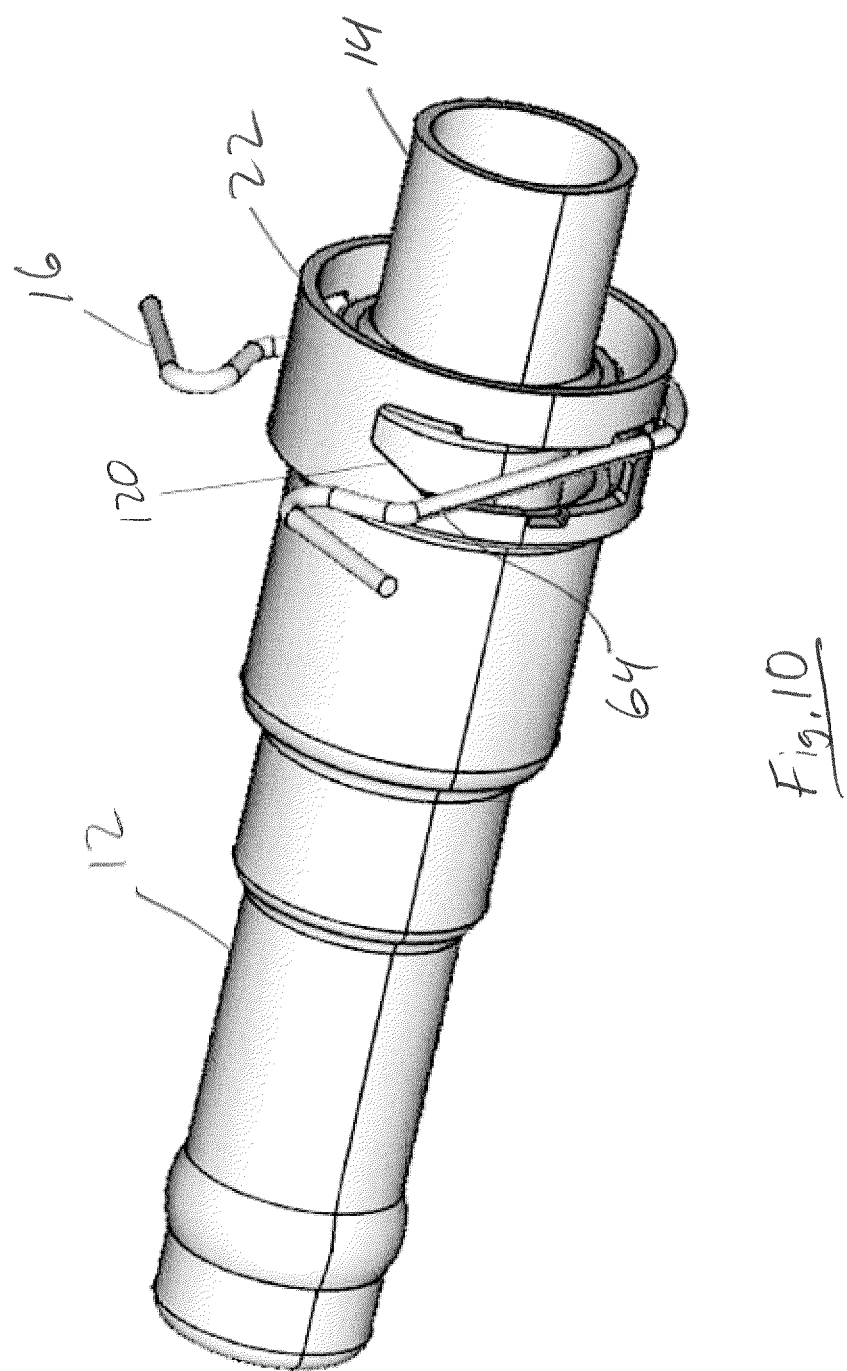

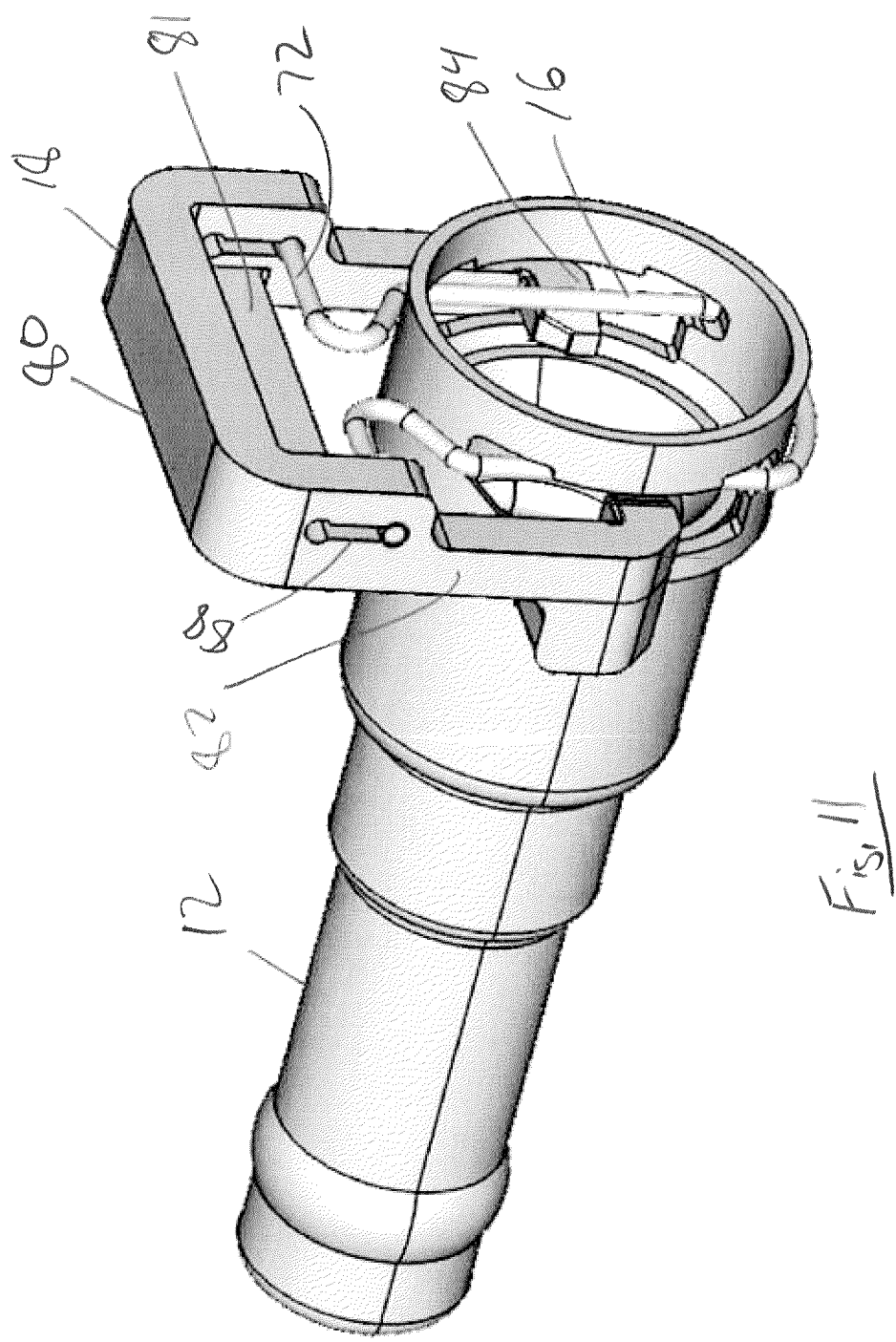

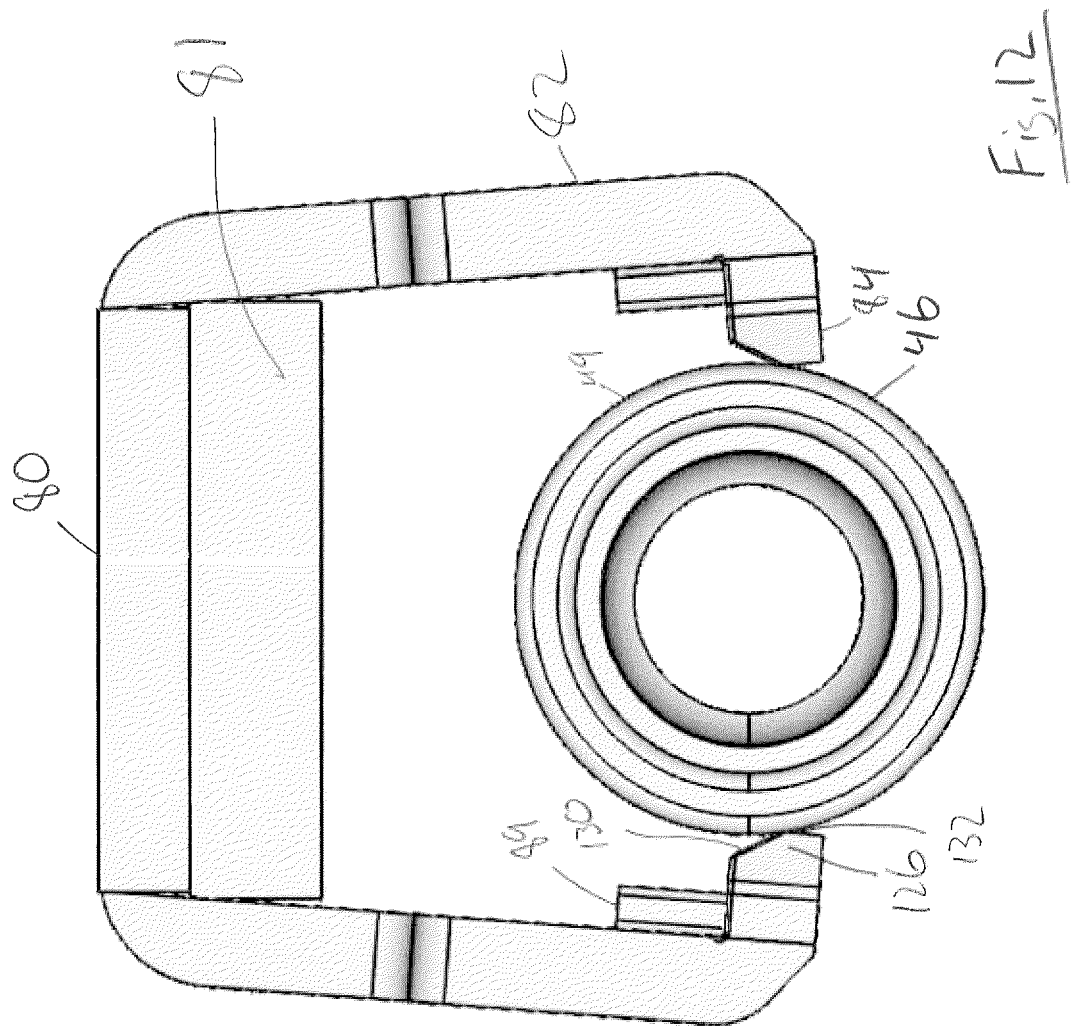

QUICK CONNECTOR

BACKGROUND OF THE INVENTION

1. Field of the Invention

This invention relates generally to a quick connector for connecting two tubes and, more particularly, to a quick connector having a low profile and verifier for confirming a connection between two tubes.

2. Description of the Related Art

Connector devices for connecting a pair of tubes are generally known in the art. Tube connections are used in a variety of applications, including automotive applications for providing a connection for delivering fluid in a motor vehicle. Due to the modular nature of automotive assembly, there is often a need for connecting a fluid passageway originating in one component for delivery to another component. Some applications of connecting two tubes include screwing one tube end to another tube end. However, such connections can be difficult to make due to access or space constraints, or the use of a special tool to ensure a sufficient connection.

Quick connector devices provide a manner of connecting tubes that is typically faster than a threaded or screw connection and can be achieved without the use of a tool to ensure an appropriate torque on a sealed connection. One type of quick connector device includes a female connector body that receives a male end form therein to provide a fluid tight connection between the female connector body and the male end form.

The male end form typically includes a male end form, such as SAE J2044, that includes a raised circumferential bead or upset on the outer surface of the end form. The female connector body includes a cavity at the insertion end that receives the male end form. A retainer is housed within the female connector body in the cavity and includes a plurality of locking beams defining a funneled shape in the insertion direction. The male end form is inserted into the female connector body, with the bead pushing past the locking beams, which can flex radially outward within the cavity to allow the bead to be pushed into the retainer. The beams will flex back after the bead has passed through them, such that the beams extend between a rear facing circumferential surface of the bead and a front facing radial surface defined by the female connector body. The male end form is therefore prevented from being retracted from the female connector body.

However, quick connectors of this type can be subject to a partial, incomplete or improper connection if the male end form is not pushed into the retainer far enough such that it clears the beams of the retainer. An incomplete connection can lead to leaks at site of the connector, which can ultimately be hazardous. Accordingly, after a connection is made, it is advantageous to confirm that the connection is proper.

One method of confirming a proper connection is to pull back on the male end form. If the male end form cannot be removed, it is presumed that the connection is proper. However, this method is not reliable, as it depends on a sufficient pulling force, and an insufficient pulling force may lead to a false positive that the connection was proper. Further, this method does not signal to other users that the connection is proper, and therefore verification of a proper connection may ultimately need to be repeated, leading to delays.

One approach to increasing the likelihood of a proper connection includes designing the retainer to have a relatively large longitudinal space in which to receive the bead of the male end form, allowing further travel of the end form. This approach increases the likelihood of a proper connection, but also increases the overall length of the coupling. This condition leads to increased space requirements and increased weight of the components.

Another approach to verification of insertion is to use an additional independent verification tool. The verification tool is inserted into the end of the female connector and will bear against the back surface of the bead, with an external portion of the verifier engaging an external portion of the female connector body only if the bead is fully inserted a predetermined distance. However, this solution requires an independent tool that is bulky and must be left in place to signal a proper connection. In some cases, there may not be space to sufficiently install the verification tool.

BRIEF DESCRIPTION OF THE DRAWINGS

FIG. 8 is a rear-side perspective view of the verifier, illustrating an actuating portion, legs, feet, and a ramped surface of the feet;

FIG. 9 is a front-side perspective view of the verifier, illustrating a tab extending forwardly from the feet that is configured to cooperate with a front notch of the windows of the entry portion of the female connector body;

FIG. 10 is a perspective view of the coupling illustrating a flexed state of the retainer in response to a forward load exerted on the holding portions by the annular upset of the male end form, where the holding portions have traveled along the ramped edge to be forced outward, allowing the upset to move past the holding portions;

FIG. 11 is a perspective view of the coupling illustrated in a first state prior to insertion of the male end form, and also illustrating a retaining state of the retainer after the retainer has allowed the upset to move beyond the holding portions; and FIG. 12 is a front view of the verifier and the male end form, illustrating the verifier in a flexed state, with the feet and legs of the verifier having been forced outward by the upset, and an inner tip of the feet contacting an outer surface of the upset, and further illustrating the verifier in a positon to be moved downward toward the state illustrated in FIG. 1.

DETAILED DESCRIPTION

FIGS. 1-12 illustrates one embodiment of a quick connector coupling 10 for coupling fluid lines and other tubes.

Figure 1:
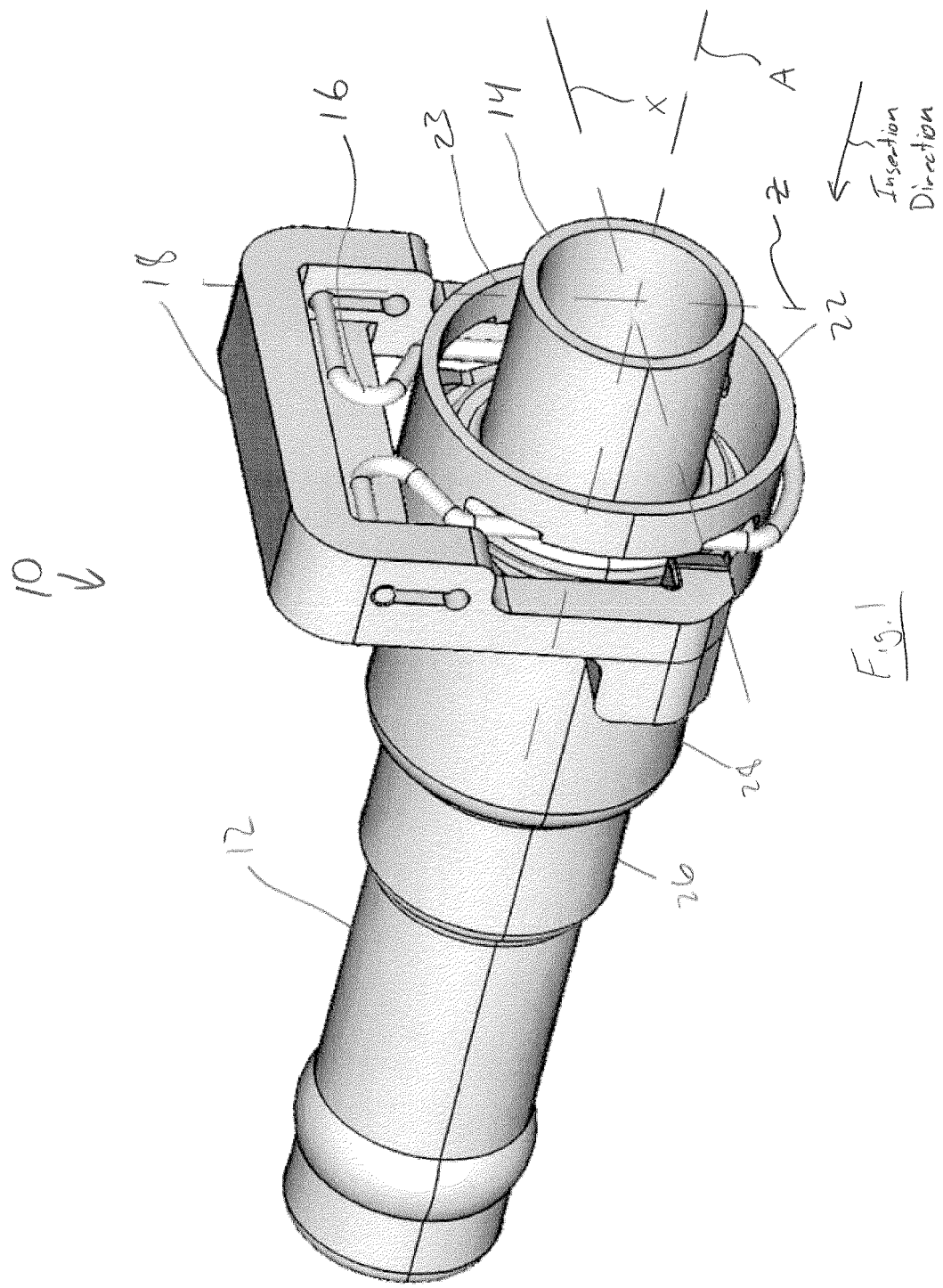
FIG. 1 is a perspective view of a quick connector coupling, including a female connector body, a male end form, a retainer, and verifier, illustrating the male end form fully inserted into the female connector body and retained by the retainer, with the verifier in a verified position.
Figure 2:
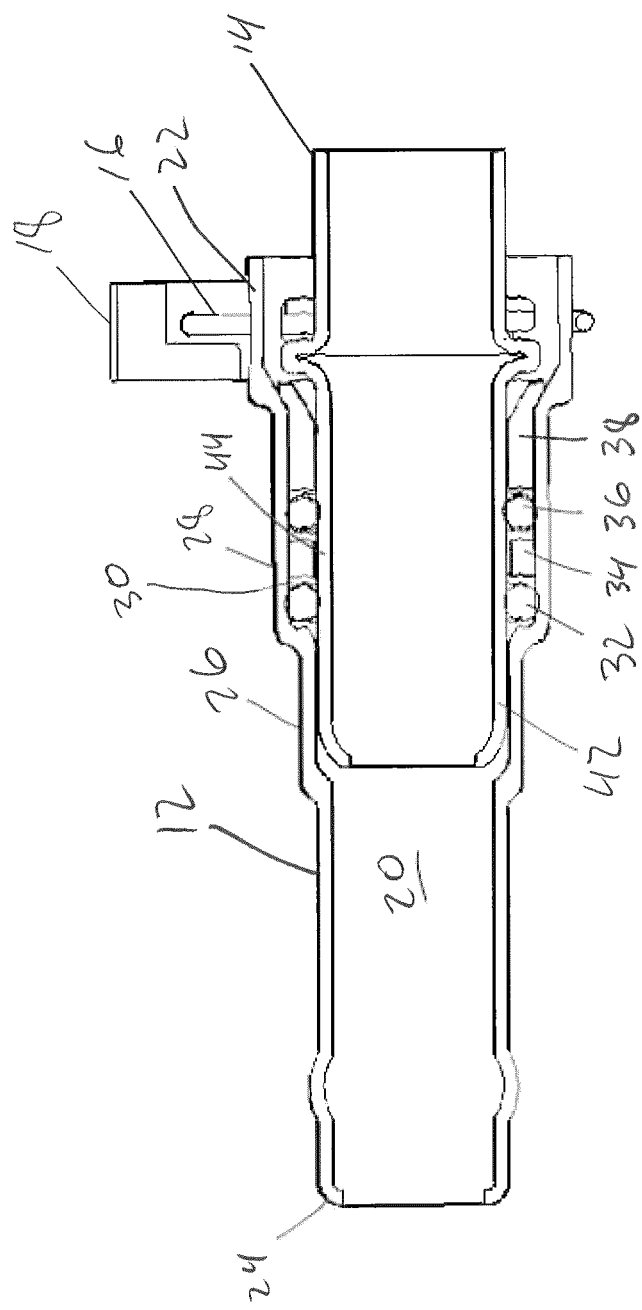
FIG. 2 is a side cross-sectional view of the coupling of FIG. 1.

As shown in FIGS. 1 and 2, the coupling 10 includes a hollow female connector body 12, a tubular male end form 14, a retainer 16, and a verifier 18.

The coupling 10 defines a longitudinal axis A, also known as a flow axis, and includes an insertion direction. For purposes of discussion, forward refers to the direction of insertion, and rearward refers to the direction opposite of insertion. The coupling 10 also includes an up-and-down z-axis Z, with top and bottom referring to opposite sides of the z-axis. The coupling 10 also defines a lateral x-axis X. References to axial herein refer to directions of movement along the longitudinal axis A. References to radial refer to movement away or toward the longitudinal axis A. Top or upper refer to areas of the coupling 10 that are above the longitudinal axis A in the Figures, and bottom or lower refer to areas that are below the axis A in the Figures. Above and below are relative terms to describe the positioning of components relative to each in other in accordance with the top/bottom and upper/lower convention described above. Front and rear refer to elements or movement along the longitudinal axis A and the insertion direction. Front refers to elements that are downstream in the insertion direction relative to rear elements. Forward facing elements face the same direction as the insertion direction. Rearward facing elements face a direction opposite the insertion direction. With reference to the Figures, the front of the coupling is on the left, and the rear of the coupling is on the right. The above described directional signals are intended to be used relative to each other. It will be appreciated that the orientation of the coupling 10 when installed or in use can be at various different orientations, such that top or upper components may be below bottom or lower components.

The female connector body 12 is preferably metal and has a generally tubular shape having multiple outer diameters and defines an inner bore 20 having multiple inner diameters that generally correspond to the outer diameters of the female connector body 12 such that the body 12 has a generally constant material thickness. The female connector body 12 includes an entry end portion 22 and an exit end portion 24. The entry end portion 22 defines an entry opening 23 and is configured to receive the male end form 14 to complete the coupling 10 when the male end form 14 is inserted into the entry end portion 22. The exit end portion 24 is configured to be attached to a further fluid line to be connected to a further component, or it may be integrally formed with the component that is to be connected with the male end form 14.

The female connector body 12 further includes a receiving portion 26 disposed at the middle of the body 12. The receiving portion 26 is sized to correspond to the outer diameter of the end of the male end form 14 when the male end form 14 is fully inserted into the female connector body 12.

The female connector body 12 also includes a sealing portion 28 disposed axially between the receiving portion 26 and the entry portion 22. The sealing portion 28 has an inner diameter that is larger than the inner diameter of the receiving portion 26. The sealing portion 28 is therefore sized to create an annular space 30 between the female connector body 12 and the male end form 14.

Figure 3:
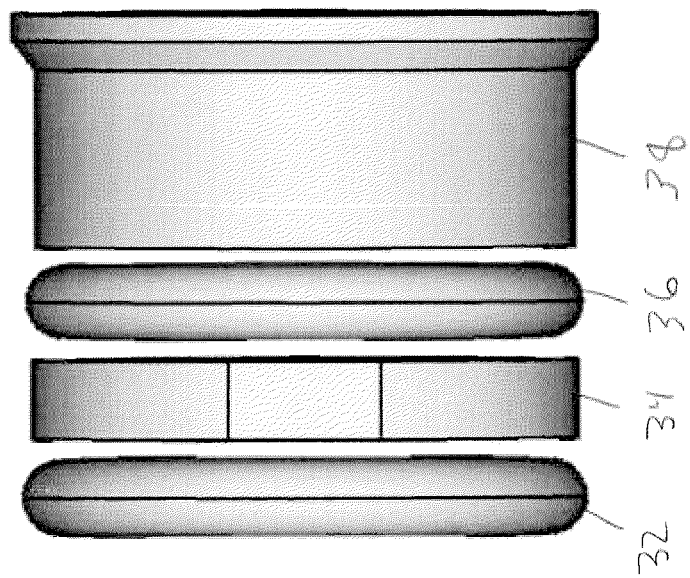
FIG. 3 is a side view of first and second o-rings, a spacer, and a sleeve that are shown disposed radially between the female connector body and the male end form in FIG. 2.

With reference to FIGS. 2 and 3, within the annular space 30, a first o-ring 32, a spacer 34, a second o-ring 36, and a sleeve 38 are disposed. The o-rings 32 and 36 are sized to be received within the annular space 30 and surround and seal the male end form 14 when the male end form 14 is inserted into the female connector body 12, providing a sealing engagement circumferentially around the interface between the male end form 14 and the female connector body 12 at the location of the o-rings 32 and 36. The spacer 34 acts as a spacing element to space the o-rings 32 and 36 from each other axially to provide an axially redundant sealing connection. The sleeve 38 is used to hold the o-rings 34 and 36 within the female connector body 12.

The male end form 14 is retained within the female connector body 12 via its engagement with the entry end portion 22 and corresponding components.

Figure 4:
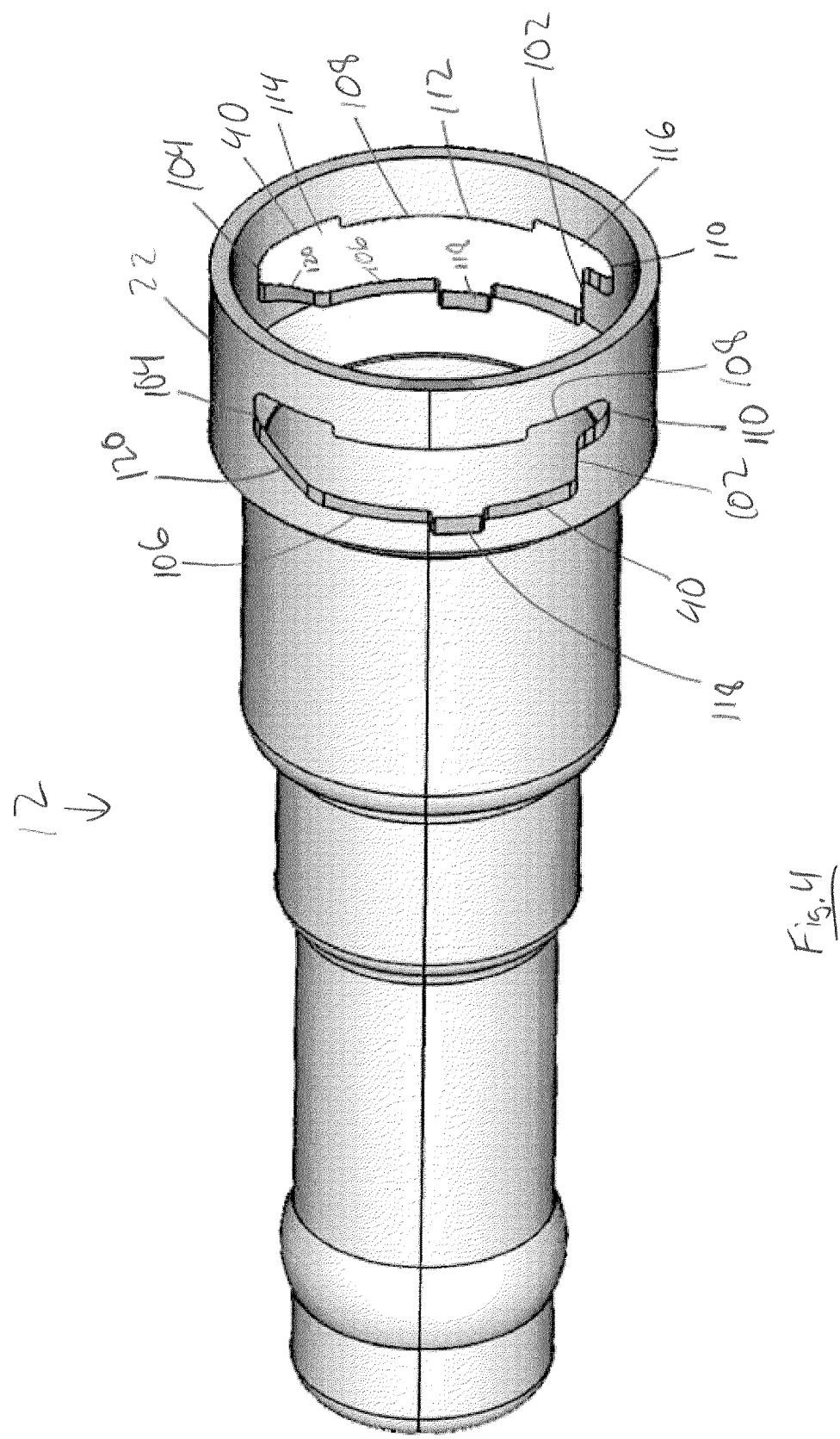
FIG. 4 is a perspective view of the female connector body, illustrating windows defined by an entry end of the female connector body and a ramped edge of the windows.

With reference to FIG. 4, the entry end 22 defines a pair of windows of openings 40 that extend through the tubular wall of the entry end 22, providing communication between the inside of the entry end 22 and the outside of the entry end 22. The windows 40 have a complex outer profile, defining various edges and surfaces in the tubular wall of the entry end 22, which are further described below. The windows 40 are preferably mirror images of each other across the entry end 22 and are disposed on diametrically opposite sides, and therefore only one of the windows 40 will be discussed in detail, with the description of one window 40 applying to the window 40 on the opposite side of the entry end 22.

Figure 5:
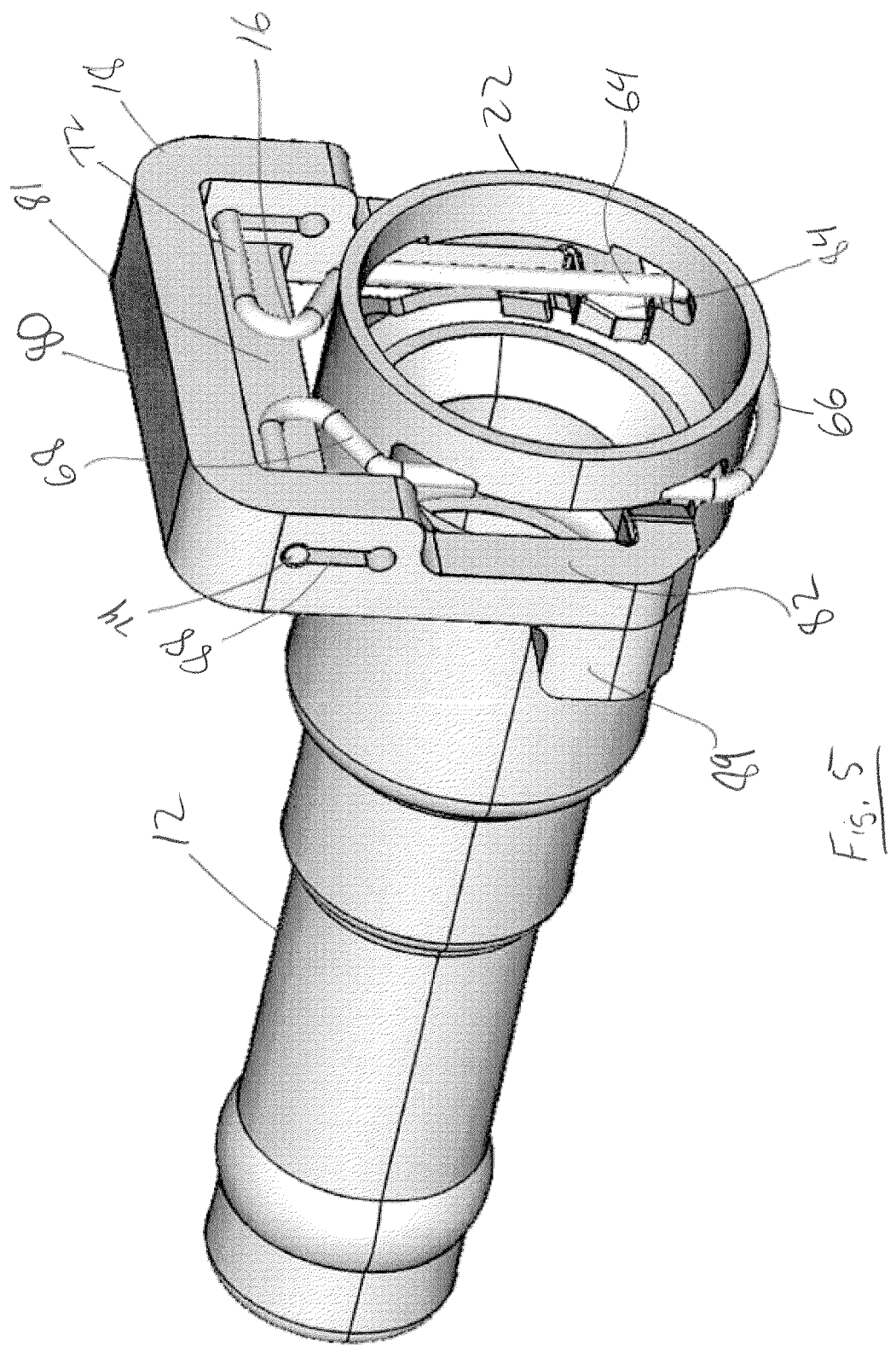
FIG. 5 is a perspective view of the coupling of FIG. 1, with the male end form removed for clarity.

With reference to FIG. 5, the retainer 16 is bent in a general U-shape, such that opposite portions of the retainer 16 extend within the windows 40 and through the bore 22 within the entry end 22. The verifier 18 also has a general U-shape, and includes portions that extend into the windows 40. Both the retainer 16 and the verifier are moveable within the windows 40 relative to the entry end 22 to accommodate, retain, and verify a proper insertion of the male end form 14, as further described below.

Figure 6:
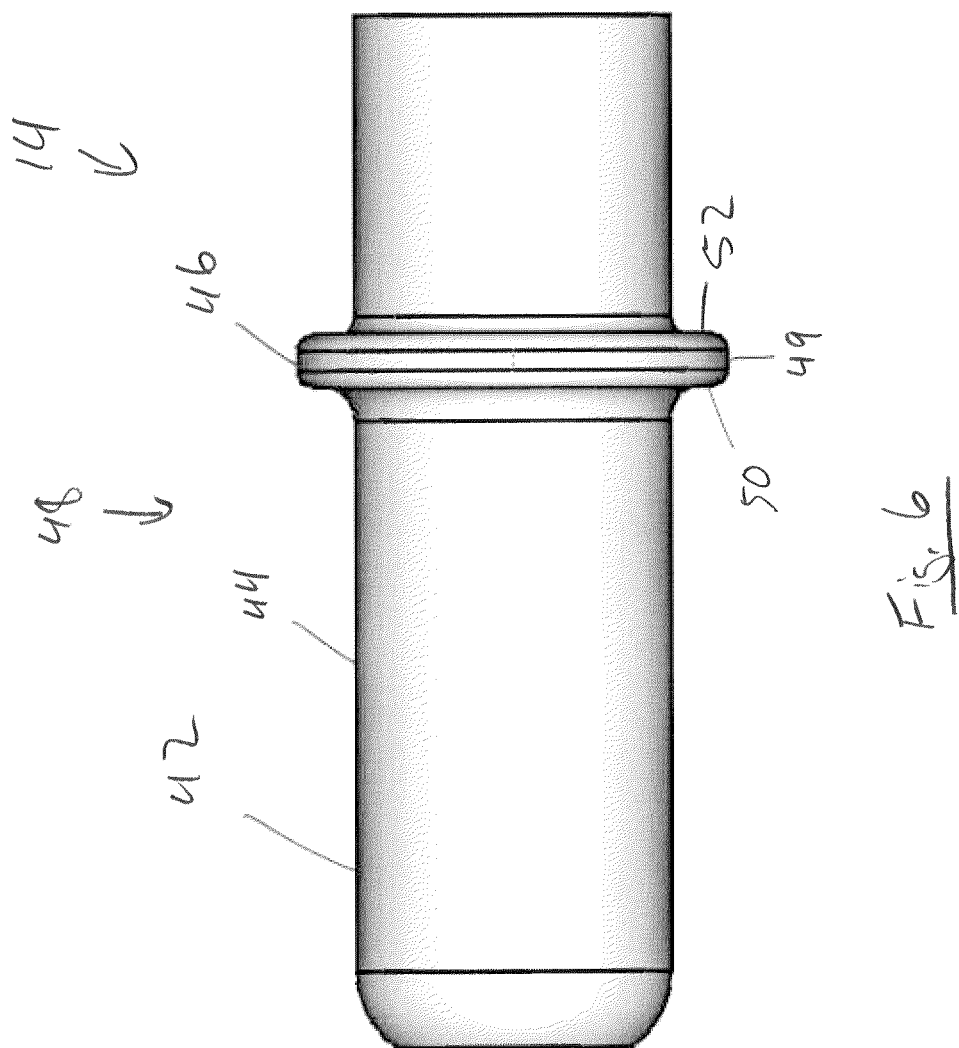
FIG. 6 is a side view of the male end form, illustrating an annular upset formed on an insertion end of the male end form.

As shown in FIGS. 2 and 6, the male end form 14 is preferably made of metal and is shaped as a hollow and rigid tube designed for carrying various fluids as desired. The male end form 14 includes an insertion end 42 that is configured to be received within the female connector body 12. The opposite end of the male end form is not shown, and can be sized and arranged to connect with various further tubes or conduits in a manner known in the art to connect further components, or it could be an integral part of a further component.

The insertion end 42 includes a sealing portion 44 disposed adjacent the terminal end of the male end form 14, with the sealing portion 44 having a smooth outer surface for sealing against the o-rings 32 and 36 and for being received in the sealing portion 28 and receiving portion 26 of the female connector body 12.

The insertion end 42 further includes a raised circumferential bead or upset 46 that extends radially outward from the outer surface of the insertion end 42 and is disposed rearward from the sealing portion 44. The upset 46 is preferably formed on the insertion end 42 as part of a homogenous and unitary structure to create a monolithic and integrally formed structure. However, in another approach, the upset 46 may be a separate ring-shaped piece that is bonded, welded, or otherwise joined to the outer surface of the insertion end 42. The upset 46 and the sealing portion 44, as well as the portion of the insertion end 42 that is disposed rearward from the upset 46 can be collectively referred to as an end form 48 of the male end form 14.

The upset 46 has a generally annular shape, and defines a radially facing outer surface 49 that extends circumferentially around the entire end form 48. The upset further defines an annular front facing surface 50 and an annular rear facing surface 52. When inserted within the female connector body 12, the front facing surface 50 will face a rear facing surface of the sleeve 38 that is disposed within the female connector body 12, and may also abut the sleeve 38. Further, with the end form 48 fully and properly inserted into the female connector body 12, the rear surface 52 will face and may abut the retainer 16, as shown in FIG. 1 and further described below.

Figure 7:
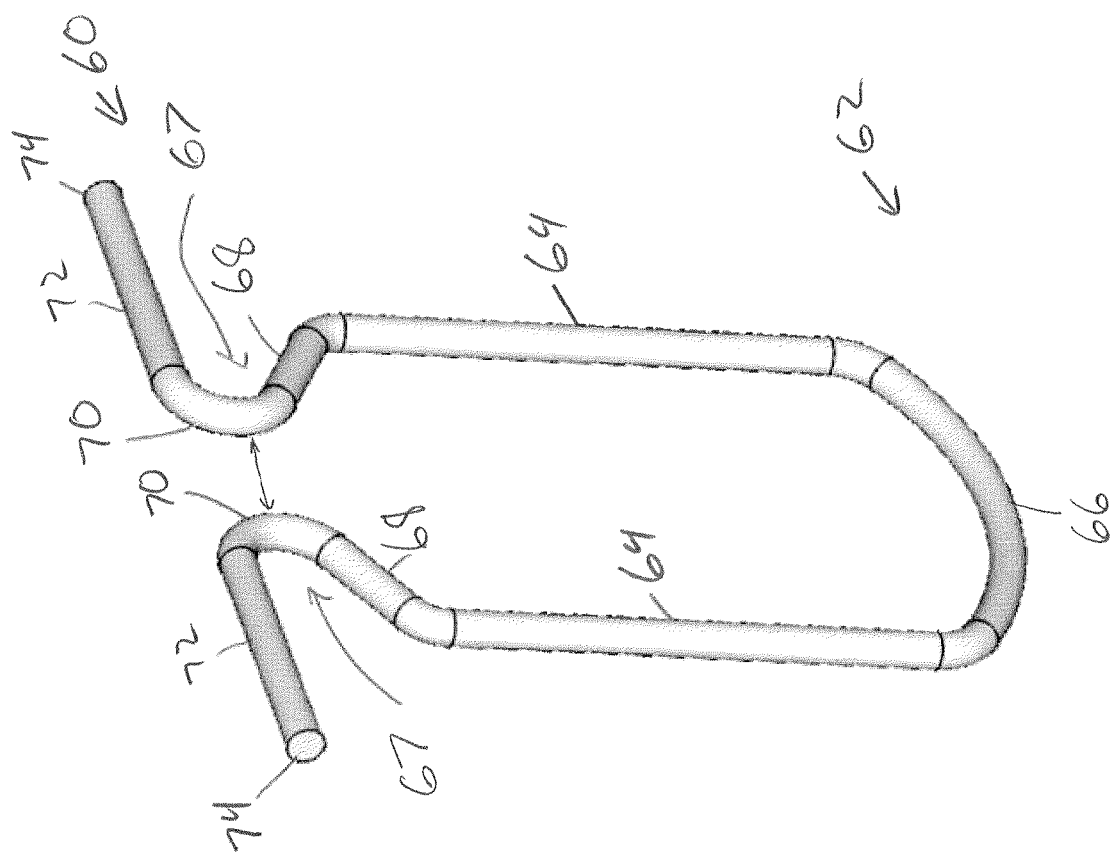
FIG. 7 is a perspective view of the wire form retainer, illustrating a curved bottom portion, holding portions, bend portions, release portions, and arm portions.

With reference now to FIGS. 5 and 7, the retainer 16 has a general U-shape and partially extends along the windows 40 and also into the entry end 22 of the female connector housing 12. The retainer 16 includes an upper end 60 and a lower end 62 as has a generally symmetrical shape, with opposite lateral sides of the retainer 16 mirroring each other. The retainer 16 further includes a pair of generally straight holding portions 64, with one on each lateral side of the retainer 16. The bottoms of the holding portion 64 are connected by a curved bottom portion 66 that extends along the outside and around the bottom of the entry portion 22 of the female connector body 12. The curved bottom portion 66 has a concave shape facing the female connector body 12, and a convex shape facing away from the female connector body 12.

The holding portions 64 extend upwardly from the bottom portion through the windows 40, such that they enter the bottom of the windows 40 and exit the top of the windows 40. Release portions 67 of the retainer 16 include inward bend portions 68 that extend laterally inward from the upper ends of the holding portions 64 toward each other and also upwardly, and are disposed on the outside of the entry end 22 of the female body portion, such that they generally extend over the outer curvature of the entry end 22 and above the connector body 12. The inward bend portions 68 can be straight (as illustrated) or slightly curved.

At the inner ends of the bend portions 68, the release portions 67 can include a transitional portion that 70 extends upwardly and away from the outer surface of the entry end 22 of the female connector body 12. At the upper ends of the transition portions 70, a pair of generally straight arm portions 72 extend laterally outward and terminate at outer terminal ends 74 thereof. The arm portions 72 are configured to couple with the verifier 18, which will be described in further detail below. In the case where no verifier is present, the arm portions 72 can optionally be excluded from the wire retainer 16. The transition portions 70 are shown as being curved to connect the bend portions 68 and the arm portions 72, but they could also be straight. The transition portions 70 of the release portions 67 define laterally inward ends that are adjacent each other above the connector body 12 and define a lateral space between the inward ends. The release portions 67 therefore have no intervening structure between them in the lateral space, which allows for the insertion of an auxiliary tool or other member to be inserted into the lateral space to easily spread the release portions 67 apart.

The wire retainer 16 is made from traditional wire stock having a preferably round cross-section. The particular wire gauge and material is selected such that the retainer 16 is resilient, where the retainer 16 can bend and flex in response to a load exerted thereon, with the retainer 16 returning to its nominal shape in response to the load no longer being applied. Thus, the retainer 16 will "spring back" after being temporarily deformed, and will exert a spring bias or return force on the component transmitting the load on the retainer 16.

With reference to FIGS. 5, 8, and 9, the verifier 18 has a generally U-shaped form and includes an upper actuating portion 80 that extends laterally across the top of the entry end 22 of the female connector body 12. The verifier 18 has a generally symmetrical shape, similar to the retainer 16 and the windows 40. The actuating portion 80 includes a front wall portion 81 that extends down from the top and is disposed forward of the top of the retainer 16. This wall portion 81 can prevent the top of the retainer 16 from being contacted by external components in a rearward direction from the front side of the wall portion 81.

The verifier 18 includes a pair of straight legs 82 that extend downward from the actuating portion 80. The legs 82 extend along the windows 40 and are preferably disposed on the outboard sides of the windows 40 such that they do not extend into the windows 40.

The verifier 18 further includes a pair of laterally inward extending feet 84 that extend from the bottoms of legs 82 into and through the windows 40 into the interior of the entry end 22 of the female connector body 12. The feet 84 are configured to cooperate with the upset 46 of the male end form 14 during insertion of the male end form 14, and are further configured to cooperate with the edge of the windows 40 to hold the verifier 18 in position prior to insertion of the male end form 14.

The legs 82 include an enlarged upper portion 86 at the interface between the legs 82 and the actuating portion 84. The upper portion 86 defines a pair of slots 88 that extend generally upward and downward along the upper portion 86. The slots 88 are sized and arranged to receive the terminal ends 74 of the arms 72 of the retainer 16, such that the arms 72 will extend into the slots 88. The slots 88 allow the arms 72 of the retainer 16 to move relative to the slots 88, such that the verifier 18 can be moved upwardly and downwardly relative to the arms 72 while exerting a limited amount of force on the retainer 16 as the verifier 18 travels.

Thus, due to the interaction between the arms 72 of the retainer 16 and the slots 88 of the verifier 18, the verifier 18 and retainer 16 are coupled to each other in one embodiment. Due to this coupling, movement of the top of the retainer 16 in the fore-and-aft direction can cause a corresponding movement of the verifier 18, which is described in further detail below.

In an alternative approach, the retainer 16 and verifier 18 can be separate from each other, such that movement of the retainer 16 will not result in corresponding movement of the verifier 18. In this approach, the verifier 18 may not include the slots 88, and the arms 72 of the retainer would not interact with the verifier 18, or the arms 72 could be excluded from the retainer 16. When the retainer 16 flexes and moves, the verifier 18 will not move. The verifier 18 can still be moved upward and downward relative to the retainer 16 without exerting a force on the retainer 16.

In the embodiment where the retainer 16 and verifier 18 are separate, the retainer 16 and verifier 18 can be arranged in the same general locations as in the embodiment where they are coupled, or they can be arranged side-by-side, or axially spaced apart, or otherwise separately spaced from each other.

Referring again generally to the verifier 18, the legs 82 of the verifier 18 can further includes a pair of enlarged lower portions 89 that extend forward from the bottom of the legs 82 and further extend inward similar to the feet 84. The lower portions 89 and feet 84 are spaced apart along the longitudinal axis A, such that the feet 84 can extend into the windows 40, with the enlarged portions extending forward of the forward edge of the entry end 22. The lower portions 89 will resist a rearward force applied to the bottom of the verifier 18 by contacting the forward edge of the entry end 22.

The verifier 18 is preferably made of a rigid but flexible plastic material that is resiliently flexible in response to a load exerted thereon, such that the legs 82 can flex outward in response to a load and return back to its nominal shape as the load is decreased.

With reference again to FIG. 4 and the windows 40, the shape of each of the windows defines a plurality of edges and other structural shapes of the entry end 22 of the female connector body 12. These edges and shapes cooperate with the retainer 16 and verifier 18 to allow the male end form 14 to be received and retained within the female connector body 12, and for the proper insertion of the male end form 14 to be verified. The shapes of the windows 40 will be described with reference to one of the windows 40, with the opposite window having the same shape mirrored across the entry end 22.

The window 40 includes a lower edge 102, an upper edge 104, a front edge 106, and a rear edge 108. For purposes of clarity and orientation, the rear edge 108 is disposed closer to the opening of the entry end 22 that receives the male end form 14 during insertion. The rear edge 108 faces forward, and the front edge 106 faces rearward.

The lower edge 102 defines a rear notch 110 that is disposed at the intersection between the lower edge 102 and the rear edge 108. The rear notch 110 receives and holds the retainer 16 at the intersection of the holding portion 64 and the curved bottom portion 66 of the retainer 16, as shown in FIG. 5.

The rear edge 108 includes a forwardly extending ledge 112 that defines an upper recess 114 at the intersection of the rear edge 108 and the upper edge 104, and further defines a lower recess 116 at the intersection of the rear edge 108 and the lower edge 102. The upper recess 114 and lower recess 116 are arranged to cooperate with the holding portion 64 of the retainer 16 when the retainer 16 is in its nominal position, either before the retainer 16 has been flexed or after it has snapped back to its nominal shape, as further described below.

The front edge 106 defines a front notch 118 that extends forwardly into the material of the entry end 22 and is open rearwardly. The front notch 118 is preferably located at the bottom half of the window 40 below the midpoint of the window 40; however, it could be located at other circumferential locations along the window 40. The front notch 118 is arranged to cooperate with the feet 84 of the verifier 18, as further described below.

The window 40 further defines a ramped edge 120 that extends between the front edge 106 and the upper edge 104. The ramped edge 120 extends from the top of the front edge 106 in an upward and rearward direction toward the upper edge 104. The ramped edge 120 accordingly also extends in a downward and forward direction from the upper edge 104 toward the front edge 106.

Due to the curvature of the entry end 22 of the female body connector 12 in which the windows 40 are defined, the windows 40 accordingly have a curved shape corresponding to the curvature of the entry end 22. Thus, the front edge 106 and the rear edge 108 are also curved, and the ramped edge 120 is curved as well.

The ramped edge 120, in addition to extending in an up/down direction and the forward/rearward direction, also extends laterally inward and laterally outward according to the curvature of the entry end 22. More particularly, the ramped edge 120 extends inwardly from the top of the front edge 106 toward the front of the upper edge 104, and outwardly from the front of the upper edge 104 toward the top of the rear front edge 106.

With reference to FIGS. 5 and 8, the retainer 16 is arranged in its nominal position where the top of the holding portion 64 is disposed at the upper recess 114 of the window 40. As the holding portion 64 is pushed in the forward direction, it will slide along the upper edge 104 toward the ramped edge 120. As the holding portion 64 contacts the top of the ramped edge 120, the holding portion 64 will slide along the ramped edge 120. The shape of the ramped edge 120 will cause the holding portion 64 to slide along the profile of the ramped edge 120 in a downward, forward, and outward direction. Accordingly, the holding portion 64 will bend outward, and the retainer 16 will be in an open state or open position relative to its nominal state or nominal position, as shown in FIG. 10.

With reference to FIG. 11, the verifier 18 is arranged in its installed or nominal position such that the actuating portion 80 is spaced away from the top of the entry end 22, with the arms 72 of the retainer 16 being disposed at the bottom of the slots 88 of the verifier 18. The feet 84 of the verifier will extend inwardly into the windows 40 at approximately the middle of the windows 40.

The feet 84 include structure that cooperates with the window 40 to hold the verifier 18 in place relative to the window 40 in the installed position. More particularly, as shown in FIG. 9, the feet include a forwardly extending tab 122 that is sized and arranged to be received in the front notch 118 (FIG. 4) of the front edge 106. Thus, a downward force that is applied to the verifier 18 will be stopped or counteracted by the interplay between the tab 122 and the front notch 118. The tab 122 can include a tapered upper surface 123.

With reference to FIGS. 8, 9, and 12, the verifier 18 is arranged to cooperate with the male end form 18 such that the feet 84 and legs 82 of the verifier 18 will be forced outward in response to a full and proper insertion of the male end form 18 into the female connector body 12. More particularly, the feet 84 of the verifier 18 define a ramped surface 124 that faces both rearward and inward. The ramped surface 124 extends in a forward and inward direction from the rear surface of the feet 84 toward an inner tip 126 of the feet 84.

Thus, a forwardly acting force on the ramped surface 124 of the feet 84 will cause the feet 84 to be pushed forward and also outward. However, because the verifier 18 is engaged with the front edge 106 of the window 40, the forward force will be stopped, resulting in the feet 84 and legs 84 of the verifier 18 moving outward, as shown in FIG. 12. Thus, insertion of the male end form 14, and in particular the upset 46, toward and against the verifier 18 in a forward direction will cause the legs 84 to be forced outward, with the inner tip 126 coming to rest against the outer surface 49 of the upset 46.

The inner tip 126 of the verifier defines a lower portion 128 and an upper portion 130. In the installed and nominal position, the lower portion 128 extends generally up and down, and the upper portion 130 tapers outwardly away from the lower portion 128, such that a bend point 132 is defined at the intersection of the upper portion 130 and the lower portion 128. The bend point 132 is the point that bears against the outer surface 49 of the upset 46 when the male end form 14 has been inserted and forced the feet 84 and legs 82 of the verifier 18 outward.

When the legs 82 and feet 84 are forced outward, the tab 122 of the feet 84 also moves outward and out of engagement with the front notch 118. Accordingly, the verifier 18 is capable of being pushed downward relative to the entry end 22 of the female connector body 12. If the upset 46 of the male end form 14 is not positioned between the feet 84 and legs 82 of the verifier 18, then the tab 122 remains engaged with the front notch 118 and the verifier 18 cannot be pushed downward.

Thus, the verifier 18 has multiple positions or states. In a first or installed position/state (FIG. 11), the actuating portion 80 of the verifier 18 is spaced away from the entry end 22, the tabs 122 engage the front notch 118, and the arms 72 of the retainer 16 are positioned at the bottom of the slot 88 of the verifier 18.

In a second or flexed position/state (FIG. 12), the actuating portion 80 is still spaced away from the entry end 22, but the feet 84 and legs 82 of the verifier 18 are pushed outward and flexed after the forward and outward force applied to the ramped surface 124 of the feet 84 by the upset 46 causes the inner tip to bear against the outer surface 49 of the upset 46. In this state, the tabs 122 of the verifier 18 are free from their engagement with the front notch 118. Additionally, the inner tip 126, and in particular the bend point 132, is seated against the outer surface 49 of the upset 46.

From the second or flexed position/state, the verifier 18 is capable of being moved downward toward the entry end 22 relative to the first and second states. This can be accomplished by pushing down on the actuating portion 80.

As the verifier 18 is pushed down, the arms 72 of the retainer 16 will slide within the slots 88 and the upper end of the slots 88 will approach the terminal ends 74 of the arms 72 of the retainer 16. Additionally, the inner tip 126 and the bend point 132 will slide along the outer surface 49 of the upset 46. As the inner tip 126 and the bend point 132 slide down along the outer surface 49, the curvature of the outer surface 49 will allow the bias in the legs 82 of the verifier to move the feet 84 and legs 82 inwardly. When the verifier 18 is fully pushed down it is in the third or verified state, as shown in FIGS. 1 and 5. Positions of the verifier 18 between the second or flexed state and the third or verified state can be referred to as transitional positions or states.

In the third or verified position/state, the terminal ends 74 of the arms 72 of the retainer 16 are positioned near the top of the slots 88. The actuating portion 80 is adjacent the outer surface of the entry end 22 of the female connector body 12. The feet 84 of the verifier are disposed at the bottom of the windows 40 and also below the outer lateral span of the upset 46. The upper portion 130 of the inner tip 126 of the feet 84 will rest against a lower portion of the outer surface 49 of the upset 46 (FIG. 1).

The third or verified position of the verifier 18 can only be achieved if the upset 46 is positioned and remains positioned radially between the inner tips 126 of the feet 84 of the verifier 18 to push them outward and disengage the tabs 122 from the front notches 118. Thus, by positioning the verifier 18 in the third or verified position, a visual indication of a proper and complete insertion of the male end form 14 into the female connector body 12 is achieved. Further, this visual verification remains in place and provides a signal to further users that the connection was completed successfully. Additionally, the verifier 18 remaining in place results in no loose verification parts that need to be disposed of or that can be lost within other adjacent components or systems.

Turning again the retainer 16, the retainer 16 likewise has multiple positions and states prior to insertion, during insertion, and after insertion that operate to allow the male end form 14 to be inserted and further allow the male end form 14 to be retained within the female connector body 12.

In a first or nominal position or state, shown in FIG. 11, the bottom of the holding portion 64 of the retainer 16 is disposed within the rear notch 110 of the window 40, the holding portion 645 extends into and through the window 40 via the lower recess 116, with the middle of the holding portion 64 being inboard of the ledge 112. The top of the holding portion 64 extends out of the upper recess 114. Thus, the holding portions 64 of the retainer 16 are disposed within the bore 20 at the entry end 22 of the female connector body 12.

The holding portions 64 are spaced apart from each other laterally such that the insertion end 42 of the male end form 14 can slide between the holding portions 64 with little to no resistance, but also such that the diameter or width of the upset 46 is greater than the span between the holding portions 64. Thus insertion of the male end form 14 into the female connector body 12 will cause the upset 46 to approach the holding portions 64 of the retainer, with the front surface 50 of the upset contacting the holding portions 64 and applying a forward force.

With reference to FIG. 10, in a second or flexed state of the retainer 16, the forward surface 50 of the upset 46 applies a forward force on the holding portions 64 of the retainer 16. The forward force applied to the retainer 16 will cause the retainer 16 to be moved forward. However, the interplay of the retainer 16 and the windows 40 will limit the bottom of the retainer 16 from being moved forward. More particularly, the bottoms of the holding portions 64 are generally held in positon axially by the rear notches 110. Thus, the holding portions 64 will bend and/or the retainer 16 will "rock" within the window 40, such that the top of the holding portions 64 of the retainer will move axially forward relative to the bottom.

As the top of the holding portion 64 moves forward in response to the forward force exerted by the upset 46 of the male end form, the holding portion 64 will bear against the ramped edge 120 and be forced outward as it moves forward. As the holding portions 64 approach the outermost end of the ramped edge 120, the holding portions 64 will spread apart sufficiently such that they will permit the upset 46 to be moved forward past the holding portions 64.

Outward movement of the holding portions 64 causes the arms 72 and their terminal ends 74 to also move outward. This outward movement of the arms 72 and the terminal ends 74 thereof is permitted by the slots 88 of the verifier 18, such that the arms 72 can be pushed laterally out of the slots 88.

The forward movement of the tops of the holding portions 64 that causes the retainer to "rock" relative to the female connector body 12 likewise can cause the verifier 18 to "rock" due to the connection between the verifier 18 and the arms 72 of the retainer. When the verifier 18 "rocks" the top edge of the tab 122 will generally remain engaged with a top edge of the notch 118, with the verifier 18 rocking about that interface.

Once the upset 46 moves past the holding portions 64 of the retainer 16, the forward and outward force on the holding portions 64 exerted by the retainer 16 will cease. At this point, the retainer 16 will move away from its flexed and open state due the bias built up in the flexed retainer 16. The retainer 16 will therefore "snap back" toward its nominal position (FIG. 11). The process of snapping back to the nominal position will cause the tops of the holding portions 64 to slide back along the ramped edge 120 in an inward and rearward direction, back toward the same position as the first position or state.

With the upset 46 disposed forward of the retainer 16, the retainer 16 is the retaining or holding position. The rear surface 52 of the upset 46 faces the retainer 16, and the upset 46 is larger in width than the span between the holding portions 64 of the retainer 16, such that the upset 46 cannot be pulled back through the retainer 16 without the holding portions 64 being spread apart.

Pulling back or otherwise exerting a rearward force on the male end form 14 will cause the rear surface 52 of the upset 46 to abut the retainer 16. Unlike moving the male end form 14 in the forward direction, a rearward force exerted on the retainer 16 will not cause the retainer 16 and its holding portions 64 to move outward, because there is no ramped surface. On the contrary, the holding portions 64 of the retainer 16 will be forced against the rear edge 108 and in particular the upper recess 114 and the lower recess 116. The ledge 112 extends along the outer edge of the retainer 16 to limit instances of the holding portions 64 bowing out in response to a rearward force.

With the retainer 16 in the holding or retaining positon, the male end form 14 will be held in place, and will remain in place regardless of actuation of the verifier 18. However, once the male end form 14 is in the proper position after clearing the retainer 16, the verifier 18 can be actuated as described above to verify and signal a proper insertion.

Removal of the male end form 14 can be accomplished readily without the use of a complicated tool. To remove the male end form 14, the holding portions 64 are manually spread apart to permit the upset 46 to clear the holding portions 64. A user can press their finger or a tool, such a screwdriver, between the release portions 67 of the retainer 16, thereby spreading the arms 72 apart as well as the holding portions 64. With the holding portions 64 spread apart, the male end form 14 can be retracted in the rearward direction, and the upset 46 will clear the holding portions 64. After the male end form 14 is removed, the retainer 16 can be released, and it will snap back to its nominal shape and position. The release portions 67 are axially exposed above the connector body 12, and this axial exposure allows the auxiliary tool to be inserted in a direction similar to the insertion direction to contact the release portions 67 and force them outward.

With the male end form 14 removed, the verifier 18 can be pushed back upwardly toward its first position. The tabs 122 will slide along the outer surface of the entry end 22 and become reseated in the front notches 118.

The above described coupling 10 can be used for a low-profile coupling, as the female connector body 12 can be made longitudinally shorter than prior arrangements that use a flexible beam style retainer ring. The above described coupling 10, by using a U-shape retainer 16, includes a shorter engagement distance between the upset 46 and the retainer 16 within the entry end. The entry end 22 can also be reduced because it does not need to accommodate the length of the prior beam-style retainer ring.

By way of example, in one embodiment, the overall length of the female connector body 12 is approximately 47 mm. The length of the sealing engagement between the female connector body 12 and male end form 14 is approximately 24 mm. The upset engagement distance within the entry end 22 is approximately 3.2 mm. The upset engagement distance is the distance that the upset travels into the connector body 12, which in previous approaches is normally over 6 mm. In the present approach, this distance can be kept under 6 mm, preferably 2.0-4.5 mm, and more preferably about 3 mm, one design being about 3.2 mm. It will be appreciated that these dimensions are exemplary, and that the various lengths described above can be a function of the diameter of the coupling.

Thus, the above described coupling 10 provides a fast and easy connection between two tubes via the connection between the male end form 14 and the female connector body 12. The coupling 10 has a reduced profile and can fit into smaller spaces and can accommodate other low profile connectors. The retainer 16 and verifier 18 combine to ensure a proper connection has been made and provides a visual signal to further users and does not result in loose parts or the need for a separate verification tool.

Although the invention has been described in terms of specific embodiments and applications, persons skilled in the art may, in light of this teaching, generate additional embodiments without exceeding the scope or departing from the spirit of the invention described and claimed herein. Accordingly, it is to be understood that the drawing and description in this disclosure are proffered to facilitate comprehension of the invention, and should not be construed to limit the scope thereof.

What is claimed is:

1. A quick connector coupling comprising:
    a hollow connector body having an internal bore defining a longitudinal flow axis, the connector body including an entry end having an entry opening for receiving a male end form introduced axially in a forward insertion direction;
    a pair of windows defined by the entry end; and
    a retainer member defined by a base and a pair of holding portions extending upwardly from the base, the base disposed below the connector body, the pair of holding portions extending through the windows, wherein the retainer has a nominal shape and is flexible and resilient such that the retainer is biased toward its nominal shape in response to being flexed;
    wherein each of the windows define a ramped edge of the connector body disposed away from the entry opening and forward of the retainer, the ramped edge extending longitudinally in the insertion direction such that forward movement of the retainer in the insertion direction presses the retainer against the ramped edge and causes the holding portions to flex and spread outward;
    wherein the retainer member includes a pair of release portions having inwardly extending bend portions extending from an upper end of the holding portions, such that the bend portions are adjacent each other with no intervening structure laterally between respective laterally inward ends of the bend portions; and
    wherein the holding portions of the retainer spread outward in response to a laterally outward force applied to the release portions.

2. The coupling of claim 1 further comprising:
    a verifier member coupled to the entry end and extending into the windows;
    the verifier including an actuating portion disposed above the entry end of the connector body and the windows;
    the verifier including a pair of legs extending downwardly from the actuating portions on each side of the entry end and along a portion of the windows;
    the verifier including a pair of feet extending inwardly from a bottom of the corresponding legs and into the windows;
    wherein the verifier is operable between a first position and a second position, the verifier being biased towards the first position;
    wherein, in the first position, each of the legs are engaged with a corresponding notch of the entry end defined by the windows to prevent movement of the actuating portion toward the connector body from the first position;

wherein, in the second position, the legs are flexed laterally outward relative to the first position and are disengaged from the notches, such that the actuating portion may move toward the connector body.

3. The coupling of claim 2, wherein the retainer includes a pair of arm portions that extend laterally outward from the release portions, and wherein the verifier defines a pair of slots on opposite sides of the verifier, the arm portions extending into the pair of slots.

4. The coupling of claim 3, wherein the pair of slots are structured such that the verifier is moveable downward toward the connector body relative to the arm portions of the retainer, such that the arm portions slide within the slots in response to downward movement of the verifier toward the connector body.

5. The coupling of claim 3, wherein the arm portions are moveable outwardly relative to verifier and the slots, such that the arm portions slide laterally through the slots in response to an outward force applied to the holding portions.

6. The coupling of claim 2, wherein each of the feet of the verifier define an axially forward extending tab, and each of the tabs extend into the notch when the verifier is in the first position.

7. The coupling of claim 6, wherein each of the tabs slide laterally outward from the notch to disengage the tab from the notch in response to outward flexing of the feet and legs caused by an outward force applied to the feet and legs, such that the verifier may move to the second position.

8. The coupling of claim 2, wherein each of the feet define a ramped surface that faces axially rearward and laterally inward, the ramped surface being disposed within the bore, wherein a predetermined force applied in the forward insertion direction to the ramped surface causes the feet to be pushed laterally outward.

9. The coupling of claim 2, further comprising a male end form having an insertion end and an annular upset portion extending radially outward from the insertion end, the insertion end being sized and arranged to slide between the holding portions of the retainer, the annular upset being sized and arranged to apply a forward force in the insertion direction to the holding portions during insertion and further sized and arranged to apply a forward force in the insertion direction to the feet during insertion.

10. The coupling of claim 1, wherein the windows define a rear edge disposed rearward from the retainer, and the rear edge includes a forwardly projecting ledge, wherein the windows further define an upper recess disposed above the ledge and a lower recess disposed below the ledge, and the holding portions of the retainer are disposed laterally inward from the ledge when the retainer is in its nominal position.

11. The coupling of claim 10, wherein, in response to a load opposite the insertion direction, the holding portions of the retainer are limited by the ledge from laterally outward movement, and the holding portions contact the rear edge and extend through the upper and lower recesses.

12. The coupling of claim 1, wherein the base, holding portions, and release portions of the retainer extend along a single common plane when the retainer is in its nominal shape.

13. The coupling of claim 12, wherein the holding portions of the retainer flex and slide along the ramped edge and move axially forward in the insertion direction and laterally outward in response to a predetermined load applied in the forward insertion direction against the retainer, and the holding portions slide back along the ramped edge rearward and inwardly when a forward load is below the predetermined load.

14. The coupling of claim 1, wherein the release portions of the retainer are located above the connector body.

15. The coupling of claim 1, wherein the release portions of the retainer are axially exposed, such that a lateral space between the release portions is accessible by an auxiliary tool.

16. A quick connector coupling comprising:
a hollow female connector body having an internal bore defining a longitudinal flow axis, the connector body including an entry end having an entry opening for receiving a male end form introduced axially in a forward insertion direction;
a pair of windows defined by the entry end and disposed on opposite lateral sides of the entry end;
a retainer member defined by a base and a pair of spaced-apart holding portions extending upwardly from the base, the base disposed below the connector body, the pair of holding portions extending through the windows, wherein the retainer has a nominal shape and is flexible and resilient such that the retainer is biased toward its nominal shape in response to being flexed; and
a verifier member coupled to the entry end, the verifier including an actuating portion disposed above the entry end of the connector body and the windows, the verifier including a pair of legs extending downwardly from the actuating portions on each side of the entry end and extending into the windows, the verifier including a pair of feet extending inwardly from the bottom of the corresponding legs and into the windows;
wherein the verifier is operable between a first position and a second position, the verifier being biased towards the first position;
wherein, in the first position, the actuating portion is limited from being moved in a downward direction toward the connector body;
wherein, in the second position, the legs and feet are spread laterally outward, and the actuating portion of the actuating portion of the verifier is moveable in a downward direction toward the connector body; and
wherein the retainer includes a pair of arm portions that extend laterally outward from the holding portions, and wherein the verifier defines a pair of slots on opposite sides of the verifier, the arm portions extending into the pair of slots.

17. The coupling of claim 16, wherein the arm portions are coupled to the verifier, wherein the actuating portion of the verifier is moveable in a downward direction toward the connector body relative to the arm portions.

18. The coupling of claim 16, wherein the retainer and verifier are separate from each other, and the retainer moves without causing a corresponding movement of the verifier.

19. The coupling of claim 16, wherein the retainer and verifier are coupled to each other, and movement of the retainer causes a corresponding movement of the verifier.

20. The coupling of claim 16, wherein each of the feet include a tab portion and each of the windows defines a front notch in the entry end, and the tab portion extends axially into the front notch when the verifier is in the first position to limit downward movement of the verifier from the first position when the verifier legs are unflexed.

21. The coupling of claim 16, wherein each of the feet include a ramped surface that faces axially rearward and laterally inward, and a forward load applied in the insertion direction to the ramped surfaces causes the feet and the legs to flex laterally outward.

22. The coupling of claim 16, wherein the verifier is moveable in a downward direction toward the connector body only when an annular upset of a male end form contacts the feet and forces the feet radially outward to transition the verifier to the second position.

23. A quick connector coupling comprising:
   a hollow connector body having an internal bore defining a longitudinal flow axis, the connector body including an entry end having an entry opening for receiving a male end form introduced axially in a forward insertion direction;
   a pair of windows defined by the entry end; and
   a retainer member defined by a base and a pair of holding portions extending upwardly from the base, the base disposed below the connector body, the pair of holding portions extending through the windows, wherein the retainer has a nominal shape and is flexible and resilient such that the retainer is biased toward its nominal shape in response to being flexed;
   wherein each of the windows define a ramped edge of the connector body disposed away from the entry opening and forward of the retainer, the ramped edge extending longitudinally in the insertion direction such that forward movement of the retainer in the insertion direction presses the retainer against the ramped edge and causes the holding portions to flex and spread outward;
   wherein the retainer member includes a pair of release portions having inwardly extending bend portions extending from an upper end of the holding portions, such that the bend portions are adjacent each other with no intervening structure laterally between respective laterally inward ends of the bend portions;
   wherein the holding portions of the retainer spread outward in response to a laterally outward force applied to the release portions; and
   wherein the windows define a rear edge disposed rearward from the retainer, and the rear edge includes a forwardly projecting ledge, wherein the windows further define an upper recess disposed above the ledge and a lower recess disposed below the ledge, and the holding portions of the retainer are disposed laterally inward from the ledge when the retainer is in its nominal position.

\* \* \* \* \*